United States Patent Office 2,981,603
Patented Apr. 25, 1961

2,981,603
RECOVERY OF SELENIUM FROM ELECTROLYTIC COPPER REFINERY SLIMES

Sidney B. Tuwiner, Baldwin, N.Y., assignor to Phelps Dodge Corporation, New York, N.Y., a corporation of New York No Drawing. Filed Aug. 26, 1957, Ser. No. 680,393

3 Claims. (Cl. 23—209)

This invention relates broadly to an improved method for recovering selenium values from anode slimes produced in the electrolytic refining of copper and particularly to a method for recovering such values in the form of a sludge of elemental selenium of high purity which is readily convertible to electronics grade selenium.

In the electrolytic refining of copper an electrolytic cell is provided with an anode of impure copper, a cathode of substantially pure copper and an electrolyte composed of copper sulfate and sulfuric acid. When a direct electrical current is passed between the electrodes in such a cell the impure copper anode dissolves in the electrolyte and pure copper is plated onto the cathode. During the refining operation a sludge or slime is deposited in the bottom of the cell. This slime is composed of impurities from the copper anode including as a rule significant amounts of selenium, tellurium, copper, lead, silica, gold and silver and lesser amounts of nickel, tin, arsenic and antimony. The selenium and tellurium content of the anode slimes occurs chiefly in the form of the selenides and tellurides of copper and the noble metals. Various methods of recovering the selenium, tellurium and noble metal values of anode slimes have been employed.

One such method is described in U.S. Patent 2,378,824 to Betterton et al. In the Betterton et al, process anode slimes are treated to convert the selenium content to a water soluble form by admixing the slimes with sodium carbonate and water to form a thick slurry or paste and thereafter heating the resulting mixture at a temperature sufficient to drive off water and yield a baked but unfused mass. The baking operation is carried out at a temperature in the range from 800–850° F. for a period of two to three hours, the roasted product is leached with water, the resulting leach liquor acidified with sulfuric acid, and the dissolved selenium precipitated with sulfur dioxide gas. This process although satisfactory for laboratory scale operations such as those described in the specific examples in the Betterton et al. patent is uneconomic and inefficient particularly when applied to the recovery of selenium values from anode slimes on a commercial scale.

It is important for efficiency and economy in the roasting of anode slimes with soda ash in order to convert the selenium content of such slimes to a water soluble form that the roasting operation be conducted at as high a temperature as feasible in order to obtain substantially complete oxidation of the oxidizable constituents of the slimes in the shortest possible time. Fusion of the slimes-soda ash mass must be avoided however since it prevents access of oxidizing gases to all portions of the mixture thus causing incomplete oxidation and consequent reduction in selenium recovery efficiency. The roasting operation should, therefore, be conducted at a temperature close to but slightly below the temperature of incipient fusion of the slimes-soda ash mixture for maximum efficiency. The temperature of incipient fusion of suitable slimes-soda ash mixtures is generally about 887° F., which is above the roasting temperatures recommended by Betterton et al. The chemical reactions which take place during the roasting operation are highly exothermic and, if allowed to proceed uncontrolled, heat the mixture to incandescence with consequent fusion and loss of selenium values. It is necessary, therefore, except in relatively small scale operations, to provide means for the removal of large quantities of heat generated by the oxidation reactions during the roasting process in order to maintain the optimum roasting temperature. The anode slimes-soda ash roasting procedures currently employed in the art are not carried out at the most efficient roasting temperatures due to the fact that it is extremely difficult to maintain the roasting temperature within the desired range just below the temperature of incipient fusion by known techniques.

The Betterton et al. process is also disadvantageous if it is desired to recover selenium in a form which is readily convertible to elemental selenium sufficiently pure to meet the specifications of the electronics industry which, due to the increased use of selenium rectifiers, has developed a large demand for high grade selenium in recent years. The selenium sludge obtained by the roasting, leaching and precipitation techniques of the Betterton et al. process normally contains impurities such as tellurium which cannot be tolerated in electronics grade selenium and which are not removed from the selenium sludge by conventional distillation procedures.

Therefore, it is an object of the present invention to provide an improved method for the recovery of selenium values from anode slimes on a commercial scale which includes roasting such slimes with soda ash at a temperature close to but below the temperature of incipient fusion of the slimes-soda ash mixture in order to convert the selenium values to a soluble form in the most efficient and expeditious manner.

It is another object of the present invention to provide an improved method for the recovery of selenium values from anode slimes whereby the selenium is recovered in a form which can be converted to highly pure electronics grade selenium by a simple distillation operation.

It is a further object of the invention to provide an improved anode slimes roasting technique which prevents loss of selenium values due to localized fusion.

It is an additional object of the invention to provide a method of roasting anode slimes which eliminates loss of significant amounts of selenium, gold and silver due to dusting during the roasting operation.

It is a further object of the invention to provide an improved anode slimes roasting operation which assures substantially complete oxidation of the oxidizable constituents of the slimes in the shortest possible time without exceeding the temperature of incipient fusion.

It is a particular object of the invention to provide an improved roasting operation which assures maximum transformation of metallic selenides present in the anode slimes to water soluble alkali metal selenates while substantially avoiding the formation of alkali metal selenites.

It is a further object of the invention to provide a technique for removing tellurium and other impurities from a raw selenium-rich leach liquor obtained according to the invention prior to the precipitation of product selenium therefrom.

Briefly, these and other objects of the invention are attained by (1) preforming a paste consisting of anode slimes, soda ash and water under controlled conditions to provide a macro-porous bed of micro-porous slimes-soda ash mixture in order to permit the circulation of air or other oxygen-containing gas through this material, (2) roasting the bed of preformed slimes-soda ash mixture at a temperature close to but below the temperature of incipient fusion of the mixture by circulating hot oxidizing gases through the bed to obtain a substantially completely oxidized product, (3) digesting the roasted product with water to obtain a raw selenium-rich leach liquor substantially free of alkali metal selenites, (4) purifying the raw leach liquor, after neutralization of any excess carbonate present, by treatment with sodium metabisulfite to convert any alkali metal selenite present to precipitated selenium and precipitate any tellurium present together with any suspended solid contaminants, and (5) precipitating the bulk of the selenium from the purified leach liquor in the form of a metallic sludge capable of conversion to rectifier grade selenium by distillation.

The economic value of selenium is such that the extraction efficiency of a commercial method for recovering selenium values from anode slimes is extremely important. The principal factors determining the efficiency of a method for this purpose in which anode slimes are roasted with soda ash have been found to be (1) the degree of intimacy of the admixture of soda ash and slime particles, (2) the degree of permeability of the slimes-soda ash mixture to air or other oxidizing gases during the roasting operation, and (3) the control of the temperature during the roasting operation.

The method of the present invention provides the required intimate mixing of the slimes and soda ash, assures maximum contact of oxidizing gases with all portions of the slimes-soda ash mixture, and provides greater control of the roasting temperature than has previously been possible.

In the new method, anode slimes, either dried or in the form of a wet filter cake, are mixed with soda ash and water to form a thick but workable paste at a temperature above 96° F. Somewhat more than the stoichiometric amount of soda ash, based on the selenium and other reactive content of the slimes, is employed in order to insure complete conversion of the selenium to a water soluble form. About 25% by weight of soda ash, based on the weight of dry slimes, has been found to be sufficient in most cases. The amount of water added to form the paste is important in achieving the purposes of the invention. Sodium carbonate exists in the form of the decahydrate or heptahydrate below 96° F. and in the form of the monohydrate above that temperature. Only sufficient water is added to the mixture of anode slimes and soda ash to produce a paste which is thick but workable at a temperature at which the soda ash is in the form of the monohydrate. Any temperature above 96° F. up to the temperature of ebullition may be employed but it has been found to be both satisfactory and convenient to form the paste at a temperature somewhat above 100° F. The slimes-soda ash paste is thoroughly mixed, working above the critical temperature, in order to assure intimate contact between the individual particles of anode slimes and soda ash.

The paste, still at a temperature above 96° F., is then extruded or formed into shaped masses by any other suitable means to provide a macro-porous bed of slimes-soda ash mixture. The resulting preformed paste masses may then be cooled below 96° F. in order to convert the sodium carbonate monohydrate in the paste to the hepta-hydrate or deca-hydrate forms. This conversion causes the paste to lose its plasticity due to the absorption of free water in the paste to form dendritic crystals of the hepta- and deca-hydrates of sodium carbonate. The increased mechanical strength imparted to the preformed masses of slimes-soda ash mixture in this way aids in maintaining the macro-porosity of the bed of shaped masses during the subsequent roasting operation. The term "macro-porous" is employed herein to indicate that a bed of preformed slimes-soda ash mixture is made up of discrete masses of controlled size which have sufficient space between them to allow large volumes of oxidizing gases to be circulated through the bed during the roasting operation.

Micro-porosity of the individual shaped masses is achieved by drying the bed of slimes-soda ash mixture to remove the water of hydration from the sodium carbonate hepta- and deca-hydrate crystals, leaving a micro-porous structure which makes possible the diffusion of oxidizing gases through the individual preformed masses. In this way a macro-porous body of micro-porous preformed masses of slimes-soda ash mixture is obtained. This bed of material has sufficient mechanical strength to retain its shape and thus its macro-porous and micro-porous structure during the roasting operation, thus assuring maximum contact of all slimes and soda ash particles with circulated oxidizing gases.

The preformed bed of slimes-soda ash mixture is subjected to a roasting operation during which large volumes of a hot oxidizing gas such as air is circulated through the bed to heat it to a temperature close to but not exceeding 887° F. which is the temperature of incipient fusion of the slimes-soda ash mixture. The roasting operation is continued for sufficient time to obtain substantially complete oxidation of the oxidizable constituents of the slimes-soda ash bed. It has been found that about one hour is sufficient in most cases when the process is operated according to the present invention. Other roasting processes require two to three times this period. As noted above, it is desirable to operate as close to the temperature of incipient fusion as possible since the desired oxidation reactions are slower at lower temperatures, requiring prolonged roasting. On the other hand, it is important not to exceed the temperature of incipient fusion since fusion of any portion of the mixture destroys the porosity of the bed and restricts the accessibility of oxidizing gases thereto thus reducing the efficiency of the roasting operation. The temperature of the oxidizing gases initially employed to heat the bed of material to be roasted may range from about 750° to 1000° F. and generally somewhat exceeds the temperature of incipient fusion; a suitable temperature being about 900° F. in most cases. Once the bed of slimes-soda ash mixture is heated to reaction temperature by the circulation of hot oxidizing gases, temperature control is complicated by the highly exothermic oxidation reactions which take place. It then becomes necessary to remove a portion of the heat generated by the oxidation reactions in order to prevent ignition of the bed to incandescence with resulting fusion of the mass and loss of selenium by volatilization. It has previously been very difficult to remove sufficient heat at this point in the process to prevent fusion, but with the macro-porous bed of the present invention this is easily accomplished by partially cooling the hot oxidizing gases prior to recirculation through the bed of slimes-soda ash mixtures.

The object of controlling the roasting operation in the manner described is to achieve exposure of the slimes-soda ash mixture to the action of oxidizing gases at the optimum temperature for sufficient time to obtain a thoroughly dead roast, i.e., complete oxidation of organic matter to destruction, copper to cupric oxide, tellurium to tellurous oxide, and selenium to sodium selenate. This can be accomplished satisfactorily only if the bed remains permeable throughout. Macro-permeability is obtained as a result of the open structure of the preformed bed which allows penetration of the hot combustion gases through the bed evenly and uniformly. Micro-permeability is the result of voids left by the evaporation of water. The pellets are porous to the diffusion of the oxidizing gases into, and of oxidation products out of, the material. The structure of the bed is also such as to afford adequate transfer of heat, at first from the gases to the material, and later from the reacting material to the gas. The heat generated by the roasting reactions is considerable. The design provides for dissipation to avoid localized overheating.

It is seen, therefore, that the macro-porous bed of micro-porous masses of slimes soda ash mixture employed in the method of the present invention not only makes possible complete oxidation of anode slimes in the shortest possible time, but also prevents localized fusion and consequent loss of selenium values and reduction in the extraction efficiency of the process.

The thoroughly oxidized product obtained from the roasting operation is leached or digested with hot water, preferably above 200° F., in order to dissolve sodium selenate and excess soda ash from the roasted product. The digestor pulp may be sampled for purposes of process control to determine (1) specific gravity of the pulp as an indication of the percent of solids, (2) specific gravity of the liquor obtained upon allowing the pulp solids to settle as an indication of the soluble selenium content, (3) alkalinity of the liquor as an indication of excess sodium carbonate and (4) the content of sodium selenite and other reducing components of the liquor by permanganate titration. The digested pulp is filtered to remove the suspended solids containing the bulk of the gold, silver, tellurium and other impurities of the anode slimes, to obtain a raw selenium-rich leach liquor which may contain some suspended solids, dissolved tellurium in an amount equivalent to possibly 0.05% of the selenium content of the liquor and minor amounts of dissolved silica, lead, and other impurities. The filter cake is processed to recover the gold, silver and tellurium content.

The raw selenium-rich leach liquor is purified, prior to recovery of its selenium content, in order to obtain high purity selenium sludge which is a principal object of the present invention. The purification operation is begun by neutralizing the raw leach liquor with concentrated sulfuric acid at a temperature of about 200° F. to obtain a pH in the range from about 5.8 to 8.0 and preferably a pH of about 6.2 in order to remove excess carbonate which would interfere with the subsequent selenium precipitation step. The addition of acid is controlled to permit the escape of carbon dioxide, which is liberated from the neutralized carbonate, without excessive foaming. The neutral point is indicated by a sudden drop in the level of foam. Tellurium is precipitated from the neutralized leach liquor by the addition of somewhat more than the stoichiometric amount of sodium metabisulfite at a temperature in the range from about 200° to 212° F. Precipitation is normally completed in from one to two hours. This treatment also serves to convert any sodium selenite present in the leach liquor to precipitated elemental selenium. The selenium precipitated drags down the tellurium and any suspended solids present by cementation. The selenium precipitated in this way ordinarily constitutes less than 10% of the total selenium content of the raw leach liquor inasmuch as sodium selenate is not affected by the metabisulfite treatment. The precipitate may be recycled to the process to recover selenium and tellurium. Filtration of the precipitate provides a sparkling clear filtrate containing no more than ten parts per million of tellurium based on the selenium content of the filtrate. Liquor purification provides an important advantage of the process by facilitating the production of the entire output of selenium as the valuable high purity rectifier grade selenium.

The selenium content of the purified leach liquor may be recovered in any suitable manner known in the art, for example, by treatment with sodium chloride, sulfuric acid and steam with subsequent addition of sulfur dioxide to precipitate a highly pure sludge of selenium. This sludge is suitably treated with sulfur dioxide, to complete the precipitation of selenium, dewatered, and dried. The dry selenium sludge can be melted using sulfuric acid and selenium powder as a flux and cast into bullion which can be distilled to obtain rectifier grade selenium.

A preferred manner of carrying out the method of the invention is described in the specific example below in which anode slimes having the following composition were treated:

Constituent of slimes:

| | | |
|---|---|---|
| Selenium | percent | 8.36 |
| Tellurium | do | 2.04 |
| Copper | do | 22.17 |
| Lead | do | 12.22 |
| Silica | do | 13.89 |
| Nickel | do | 0.40 |
| Tin | do | 3.04 |
| Arsenic | do | 1.05 |
| Antimony | do | 2.11 |
| Silver | ounces per ton | 3,837.50 |
| Gold | do | 116.95 |

Two hundred pounds of dried anode slimes of the above composition were blended with 50 pounds of soda ash and 50 pounds of water in a jacketed sigma blade mixer of 25 gallon capacity with intensive mixing for one hour at a temperature of 122° F. At the end of this period the mixture, having the consistency of a heavy paste, was extruded at a temperature of 100° F. through 1/8 inch orifices, allowing the extruded product to coil upon itself to form a bed 1¼ inches deep upon a moving pan conveyor having a perforated steel bottom with ¼ inch perforations spaced 3/8 inch apart. The conveyor, which was 6 inches wide, moved at a speed of 45 inches per hour allowing the bed of preformed material to cool to about room temperature (below 96° F.) for 15 minutes before passing through a furnace 5 feet long in which oxidizing gases at a temperature of 880° F. were drawn downward at a velocity of 2.5 feet per second through the moving preformed bed, the operation being a continuous one. The slimes-soda ash mixture was thoroughly friable and free flowing after about an hour in the furnace.

The roasted product was leached with water at about 200° F. and filtered to recover sodium selenate together with other water soluble components including unreacted sodium carbonate equal to 13% of the soda ash used in the process.

The raw selenium containing each liquor was neutralized at a temperature of about 200° F. with concentrated sulfuric acid to pH 6.2 and 30 pounds of sodium metabisulfite added. The liquor was agitated and digested at a temperature from 200° to 212° F. for about two hours to precipitate tellurium and any selenium present as the selenite. After filtration the leach liquor was clear and bright and was determined to contain less than ten parts per million of tellurium based on the selenium content. The hot leach liquor was run into a tank onto rock salt (NaCl) together with sulfuric acid. Chlorine gas was given off with consequent agitation of the solution for about two hours. At the end of that time sulfur dioxide gas was injected into the solution at widely separated points to precipitate selenium. After about 15 hours the treatment was complete and the precipitated selenium sludge was recovered, treated with sulfur dioxide, repulped and thickened, dewatered and dried. The dried sludge was melted over a direct fire using sulfuric acid as a flux. Bullion was cast at 600° F. This bullion when distilled according to known methods provided rectifier grade selenium containing less than ten parts per million of tellurium.

It is to be understood that the above specific example is merely illustrative and is not to be construed as limiting the scope of the invention as described and claimed herein.

What is claimed is:

1. A process for the recovery of selenium from selenium-bearing anode slimes containing a substantial amount of tellurium produced in the electrolytic refining of copper which comprises mixing said anode slimes with at least the stoichiometric amount of sodium carbonate to convert all of the selenium to selenate and sufficient water to form a thick paste at a temperature above the transition temperature of sodium carbonate heptahydrate to sodium carbonate monohydrate, extruding the paste above said temperature through orifice means thereby forming said paste into an elongate extruded product, forming said extruded product into a bed of preformed masses of paste having macro-porous spaces therein, drying the bed of preformed paste masses having macro-porous spaces therein and thereby removing the water of hydration of the sodium carbonate thus forming a dried macro-porous bed of micro-porous preformed masses of slimes-soda ash mixture, roasting said resulting dried macro-porous bed of micro-porous preformed masses of dehydrated slimes-soda ash mixture by circulating therethrough oxidizing gases maintained at a temperature sufficiently high to oxidize the oxidizable constituents in said bed but below a temperature which will cause the material in said bed to reach its fusion temperature for a period of time sufficient to obtain substantially complete oxidation of the oxidizable constituents of the material in the bed thereby converting selenium therein to a water-soluble selenium compound, leaching the roasted product with water to dissolve the water soluble selenium compound, neutralizing the leach liquor with inorganic acid, purifying the resulting leach liquor after said neutralization by the addition of sufficient sodium metabisulfite to precipitate any tellurium present in the leach liquor and to convert any alkali metal-selenite present in the leach liquor to elemental selenium to precipitate it out of the leach liquor, filtering the resulting leach liquor solution to obtain a purified selenium-rich leach liquor and recovering therefrom a selenium sludge of high purity.

2. A process for the recovery of selenium from selenium-bearing anode slimes containing a substantial amount of tellurium produced in the electrolytic refining of copper which comprises mixing said anode slimes with about 25% by weight of sodium carbonate based on the weight of dry slimes, and sufficient water to form a thick paste at a temperature above 96° F. but below the boiling point of water, extruding the paste through orifice means above a temperature of 96° F. but below the boiling point of water and forming the paste as an extruded product in elongate form, then coiling the extruded product on itself to form a bed of preformed masses of paste having macro-porous spaces therein, drying the bed of preformed paste masses having said macro-porous spaces therein and thereby removing the water of hydration from said sodium carbonate in said mixture thereby forming a macro-porous bed of preformed microporous masses of dehydrated slimes-soda ash mixture, roasting the resulting bed of preformed masses of dehydrated slimes-soda ash mixture by circulating through said bed an oxidizing gas comprising air maintained at a temperature sufficiently high to oxidize the oxidizable constituents of the material in said bed but below 887° F. to avoid fusion of the mixture and circulating said oxidizing gas through said bed for a time long enough to oxidize the selenium compounds present in said mixture, leaching the roasted product with water at a temperature of about 200° F., purifying the resulting leach liquor, after neutralization to about pH 6.2 with concentrated sulfuric acid, by the addition of sufficient sodium metabisulfite to precipitate any tellurium and to convert any alkali metal selenite present in said leach liquor to elemental selenium and to precipitate it, and recovering substantially pure selenium sludge from said purified leach liquor.

3. A process for the recovery of selenium from selenium-bearing anode slimes produced in the electrolytic refining of copper, which comprises mixing said anode slimes with sodium carbonate in an amount exceeding the stoichiometric amount required to react with the selenium contained in the mixture, adding sufficient water to the mixture to form an extrudable thick paste at a temperature above that at which sodium carbonate heptahydrate is converted to sodium carbonate monohydrate, extruding the paste through orifice means while maintaining the sodium carbonate therein in monohydrate form, thereby to produce an extruded product in elongate form capable of being coiled upon itself, forming the extruded paste mixture into a bed of discrete preformed masses of extruded product of controlled sizes having therein macro-porous spaces, drying said preformed masses thereby removing water contained therein and forming a macro-porous bed of preformed micro-porous masses of dehydrated slimes-sodium carbonate mixture, then roasting the resulting bed by circulating therethrough oxidizing gases containing a substantial amount of air while maintaining the temperature of said circulating oxidizing gases at a temperature within the range of 750° and 1,000° F. but at such temperature within said range which maintains the temperature of said bed near to but below the fusion temperature of the material in said bed to maintain macro and micro permeability in said bed while said oxidizing gases are being circulated therethrough, said oxidizing gases thereby converting selenium contained therein to water-soluble sodium selenate form while simultaneously carrying away from said bed exothermic heat generated therein, thereafter leaching the roasted product with water to form a liquor containg sodium selenate and recovering the selenium from the leach liquor containing said water soluble sodium selenate.

References Cited in the file of this patent

UNITED STATES PATENTS

| 2,048,563 | Poland | July 21, 1936 |
| 2,349,697 | Bierly | May 23, 1944 |
| 2,378,824 | Betterton et al. | June 19, 1945 |
| 2,598,796 | Hulthen et al. | June 3, 1952 |
| 2,834,673 | Lynch et al. | May 13, 1958 |
| 2,863,731 | Porter | Dec. 9, 1958 |
| 2,948,591 | Hardwerk et al. | Aug. 9, 1960 |

OTHER REFERENCES

Mellor: "Comprehensive Treatise on Inorganic and Theoretical Chemistry," Longmans, Green and Co., New York, 1923, vol. 10, pages 697, 698, 706, 751.

Schloen et al. in "Journals of Metals," vol. 188, pages 764 to 777 (1950).